June 12, 1923.
J. FRANK ET AL
1,458,695
ALMOND BLANCHING MACHINE
Filed March 15, 1922
3 Sheets-Sheet 1
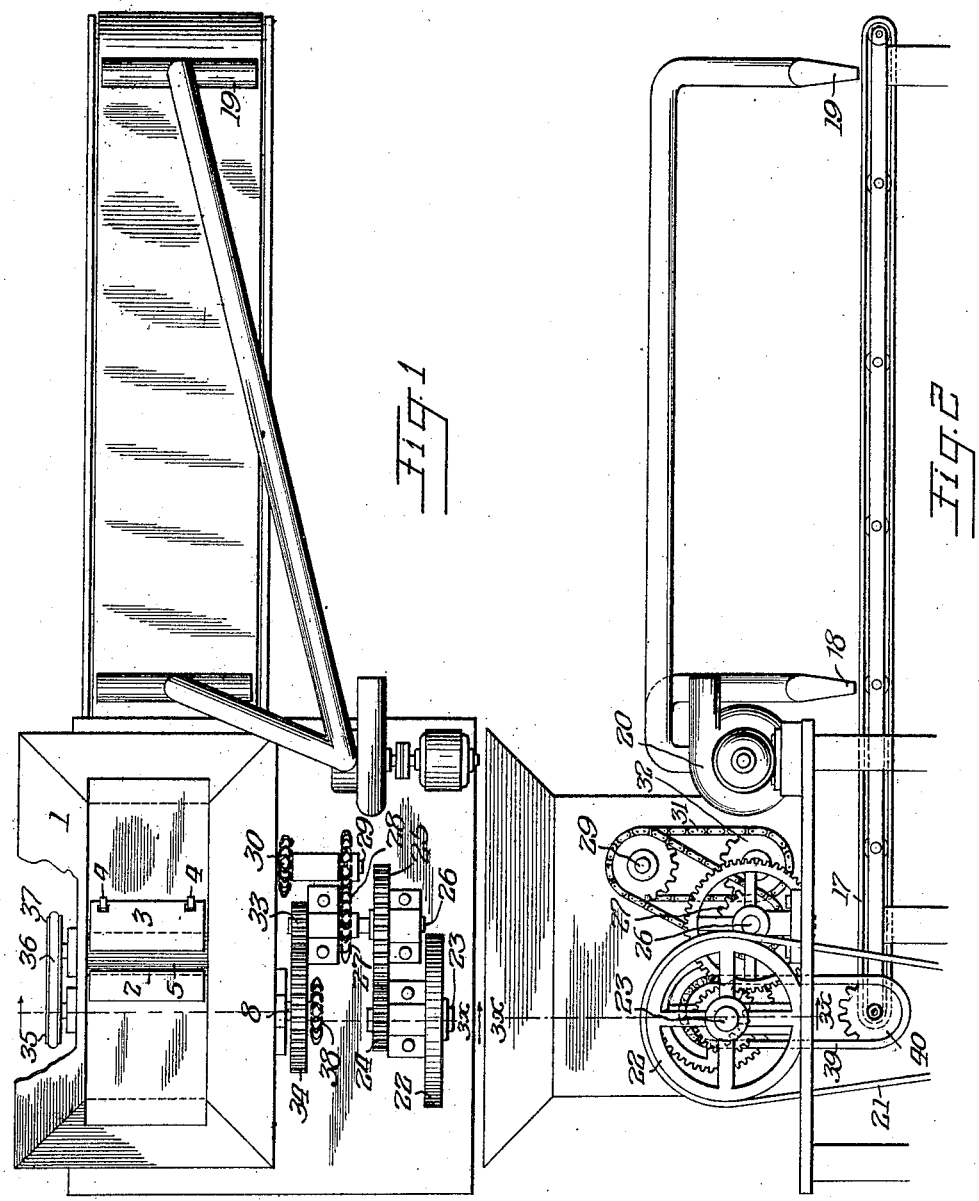
INVENTORS:
Julius Frank & Joe Davis Pirtle
BY
Wilkinson, Huxley, Byron & Knight
ATTORNEYS.

June 12, 1923.
J. FRANK ET AL
1,458,695
ALMOND BLANCHING MACHINE
Filed March 15, 1922
3 Sheets-Sheet 2
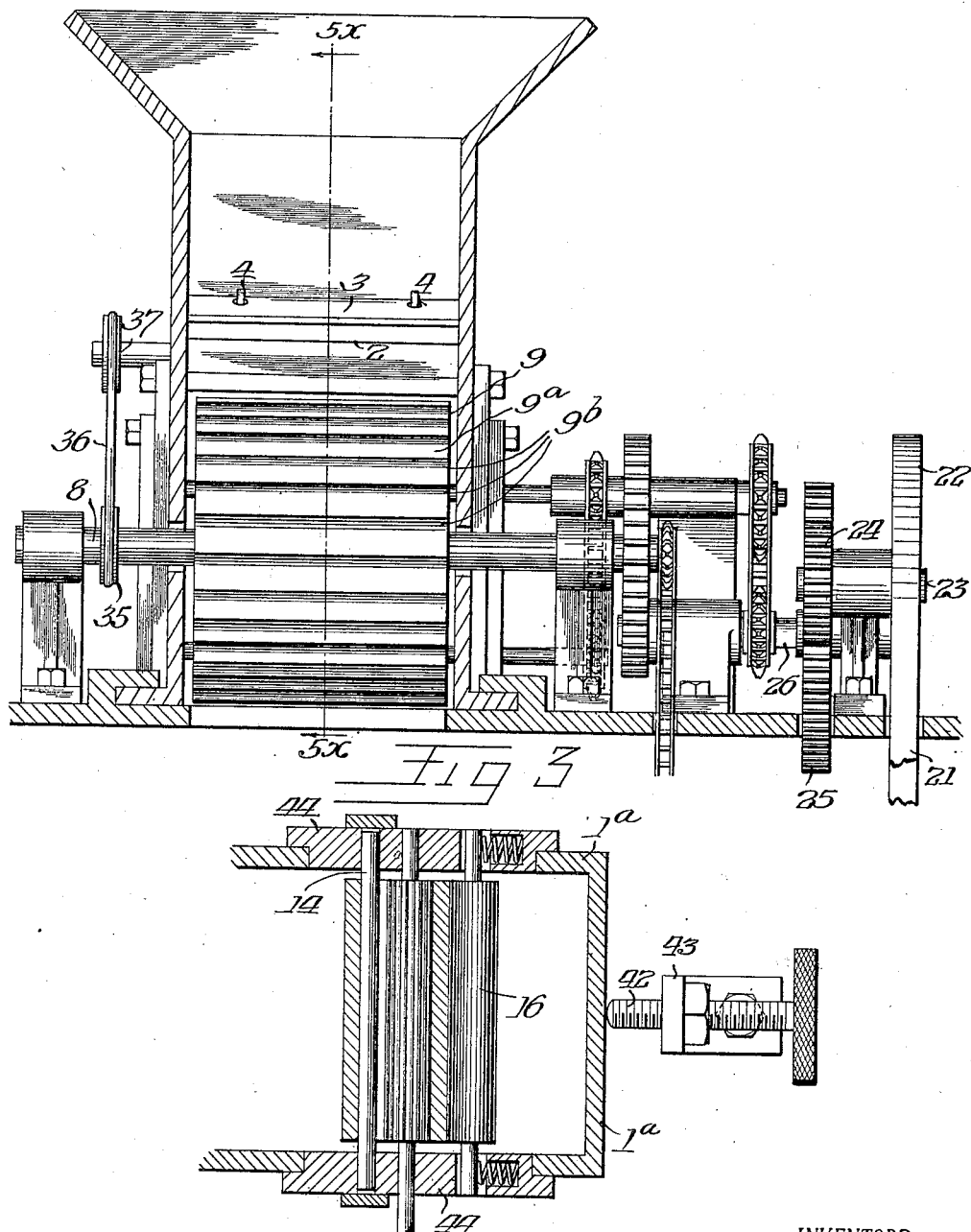

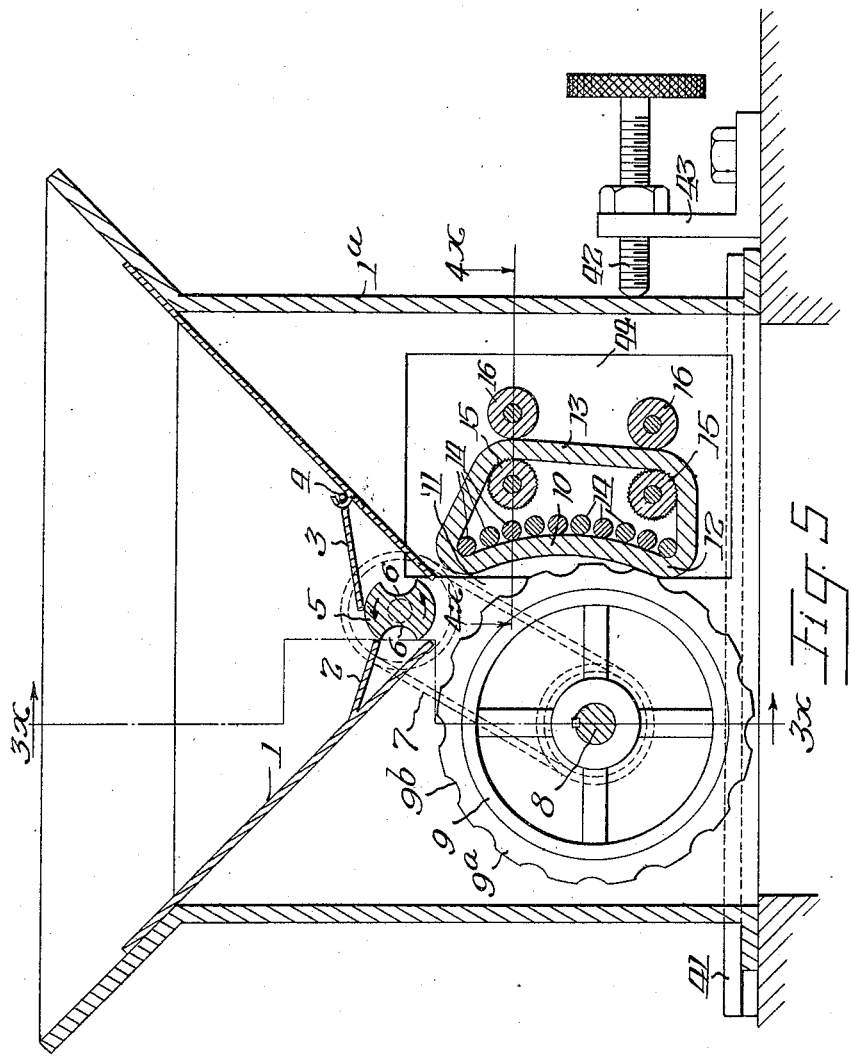

Patented June 12, 1923.

1,458,695

UNITED STATES PATENT OFFICE.

JULIUS FRANK AND JOE DAVIS PIRTLE, OF CHICAGO, ILLINOIS.

ALMOND-BLANCHING MACHINE.

Application filed March 15, 1922. Serial No. 543,861.

*To all whom it may concern:*

Be it known that we, JULIUS FRANK and JOE DAVIS PIRTLE, citizens of the United States, residing at Chicago, in the county of Cook and State of Illinois, have jointly invented certain new and useful Improvements in Almond-Blanching Machines, of which the following is a specification.

This invention relates to a machine for the treatment of almonds or other like nut kernels to remove the skins.

It has heretofore been proposed to remove the skins of almonds by steaming the kernels and then passing them between two relatively moving cylinders or other bodies with soft facings in a manner to rub the skins loose from the meat of the nut, after which the skins were separated by air suction or other suitable means.

The object of the present invention is to provide an improved construction of machine working on this general principle. One feature of the invention consists in developing the relatively moving rubbing members in the form of a cylinder, and a belt of relatively soft material, such as rubber, traveling in an endless path, a portion of which constitutes a concave presented toward the cylinder; the cylinder being provided with longitudinally arranged circumferential grooves which form pockets for trapping the nuts to be blanched, and the belt being made to travel over the nut so held, at a lesser surface speed than the travel of the cylinder, so that the skin is rubbed loose.

Another feature consists in arranging the concave formed by the belt with the center of its arc sufficiently displaced from the center of the cylinder to cause the concave to approach more nearly to the cylinder at its lower end, so that there is ample opening to receive the nut at the upper end, while the lower end develops a pressure upon the nut sufficiently to expel it as the pocket in which it is located begins to open up beyond the concave; still another feature, and one incident to this part of the invention, consisting in mounting the endless belt which forms the concave, as well as its driving mechanism, in adjustable relation to the cylinder so that the space between them can be regulated at will.

Another object of the invention is to provide a combined agitating and measuring feed for the nuts, and, accordingly, another feature consists in providing a hopper above the mouth formed between the concave and cylinder, and locating in the bottom of this hopper a revolving gate having pockets which admit the nuts successively and convey them to and discharge them into the mouth; a panel pivotally secured to a side of the hopper being positioned to rest with its free edge upon the revolving gate in position to drop into the pockets as they arrive beneath it and induce a settlement of the nuts, and to be again elevated by the camming action of the gate to raise the mass of nuts, so that the nuts are kept loosened up and free to be fed by the gate.

In order that the invention may be fully understood, the preferred embodiment thereof is shown in the accompanying drawings.

In said drawings—

Figure 1 is a top plan view, partly broken away, and Figure 2 a side elevation of the complete machine.

Figure 3 is a transverse section on an enlarged scale, taken in a plane corresponding to the line $3^x$—$3^x$ of Figures 1, 2, and 5.

Figure 4 is a horizontal section on the line $4^x$—$4^x$ of Figure 5.

Figure 5 is a vertical section on an enlarged scale on the line $5^x$—$5^x$ of Figure 3.

1 represents the feed hopper, which is provided with a fixed bottom panel 2 and a movable bottom panel 3 pivotally secured to a side of the hopper at 4. Beneath the panels 2 and 3, and in position to support the latter, is a revolving gate 5 having pockets 6 by which the nuts are received in delivering measured quantities thereof from the hopper. Panel 3 is adapted to drop into a pocket 6 as the gate revolves in the direction of the arrows, and in so dropping agitates the mass of nuts above the panels and keeps them in a loose condition ready for feeding. By continued rotation of the gate, the rear corner of a pocket develops a camming action against the movable panel 3 and restores it to its upper position, thereby lifting the mass of nuts and increasing the agitation thereof.

Gate 5 is driven by a belt 7 from a shaft 8. Beneath the hopper 1 is a cylinder 9 and a concave 10 arranged with the center of the arc of the concave eccentric to the shaft 8, so that a mouth 11 is developed in position to receive nuts discharged by the gate 5, while the lower end 12 of the concave approaches closely to the cylinder 9 in a manner to develop an increased rubbing action as well as increased pressure upon the nuts as they feed downwardly. Another effect of eccentricity between the concave 10 and the cylinder 9 is to cause the nuts to rock or shift in their bearings or seats which they occupy on the cylinder 9, and thereby loosen the skin from the side of the kernel away from the concave 10 in addition to displacement of the skin on the side toward the concave.

In order that the surface of the concave 10 may travel, it is developed from an endless belt 13 traveling over rollers 14 which develop its concaved form, and driven by rollers 15 upon which it is pressed by idlers 16 in order to positively determine its rate of travel.

In order that the cylinder 9 and concave 10 may be adapted to properly treat the nuts fed between them, their working surfaces are developed from relatively soft and resilient material, such as rubber, and being applied in the form of a cylindrical jacket 9ª upon the cylinder 9, and in the form of solid rubber strengthened by fabric in developing the belt 13. The nuts may form their own pockets by embedding themselves in the facing 9ª of the cylinder 9, but it is preferable to mold longitudinal ribs or grooves 9ᵇ in order to properly space the nuts and prevent them from contacting one upon another. The belt 13 travels at a lesser surface speed than the cylinder 9, so that the function of the cylinder is to determine the rate of travel of the nuts through the machine while the belt rubs off the skin on the side toward the concave and causes the nuts to turn in their pockets sufficiently to dislodge the skin from the opposite side.

From the cylinder 9 the nuts drop upon an endless apron 17 by which they are fed past the skin removing suction tubes 18, 19, under control of the suction fan 20, and from which endless apron the cleaned and blanched goods are delivered into any suitable receptacle.

The machine is driven by a belt 21 running over pulley 22 on shaft 23 which carries a gear wheel 24 meshing with gear wheel 25 on a shaft 26. Shaft 26 carries a sprocket 27 transmitting motion through chain 28 to the upper concaved belt shaft 29, which in turn transmits equal movement through sprocket 30 and chain 31 to the lower concaved belt driving sprocket 32. Said shaft 26 also carries a pinion 33 which meshes with a pinion 34 on the shaft 8, and thereby transmits desired speed to the cylinder 9. On the opposite end of the shaft 8 is a pulley 35 which is connected by belt 36 to a pulley 37 on the shaft of the feeding gate 5. Endless belt 17 is driven from shaft 8 through the sprocket 38, chain 39, and sprocket 40.

In order to regulate the distance between the concave 10 which is mounted in the frame 1ª and the cylinder 9 which is supported on fixed bearings outside the frame, the entire frame 1ª of the hopper 1 is mounted in a slide track 41 and is adapted to be adjusted by the screw 42 mounted in a fixed standard 43.

Shaft 29 which carries the upper driving cylinder 15 (Fig. 5) of the concaved belt 13, as well as the shaft which carries the liner belt driving cylinder 15 and its driving sprocket 32, are mounted in plates 44 carried by the hopper frame 1ª, as shown in Figures 4 and 5, and this permits the hopper frame to be adjusted under the action of screw 42, as described. Plates 44 will also be made to carry the arcuate series of idle rollers 14 and the rollers 16 which press the belt 13 against the positively driven feed rolls 15. The range of adjustment of the concaved belt 10 to and from the cylinder 9 will be relatively slight and well within that which will be permitted by the chain drive 27, 28, 29 without impairing the driving effect of the chain.

The cylinder 9 travels at a rate which gives its facing 9ª about five times the surface speed of that of the belt 13, and thus the cylinder develops the rate at which the nuts pass through the machine. It is important, however, that the belt 13 have a positively imparted movement as the tendency of the nuts to slip backward under the least pressure is very great while they are moist from the steaming, and it is also important that the belt be given uniform speed at the two ends of the concave in order to avoid stretching it out between these points.

We claim:

1. In a nut blanching machine, the combination of a revolving cylinder and a traveling belt having a concaved path adjacent to the periphery of said cylinder; means being provided for driving said cylinder and belt at different speeds.

2. In a nut blanching machine, the combination of a revolving cylinder and a traveling belt having a concaved path adjacent to the periphery of said cylinder; means being provided for positively driving said cylinder and belt, the cylinder being driven faster than the belt.

3. In a nut blanching machine, the combination of a cylinder, a belt having a concaved path adjacent to said cylinder, and means for positively driving said cylinder and belt; said cylinder having pockets through which it positions the nuts in presenting them to the action of the belt.

4. In a nut blanching machine, the combination of a cylinder, a belt having a concaved path adjacent to said cylinder, and means for positively driving said cylinder and belt; said cylinder having pockets through which it positions the nuts in presenting them to the action of the belt; the belt having a surface speed less than that of the cylinder.

5. In a nut blanching machine, a cylinder, an endless belt coacting with said cylinder through a portion of its travel, and means for imparting to the coacting portion of the belt a concaved path with the center of the concave eccentric to that of the cylinder, whereby the belt approaches the cylinder in traversing its said concaved path.

6. In a nut blanching machine, the combination of a cylinder and a traveling belt coacting with said cylinder and having a concaved path in the portion thereof which coacts with the cylinder; said cylinder having a relatively soft resilient facing which adapts the nuts to embed themselves therein.

7. In a nut blanching machine, the combination of a cylinder and a traveling belt coacting with said cylinder and having a concaved path in the portion thereof which coacts with the cylinder; said cylinder having a relatively soft resilient facing which adapts the nuts to embed themselves therein; said facing being constructed with pockets which determine the positions of the nuts thereon.

8. In a nut blanching machine, the combination of a cylinder having a soft resilient facing, and an endless belt coacting with said cylinder, traversing a concaved path in its coacting portion, and constructed of soft resilient material.

9. In a nut blanching machine, the combination of a revolving cylinder, an endless belt traveling in a concaved path but coacting with said cylinder, and means for adjusting the belt relatively to the cylinder.

10. In a nut blanching machine, a revolving cylinder, an apron coacting with the surface of said cylinder to rub the skins from nuts presented between them, and means for positively driving and uniformly feeding the apron at opposite ends of its portion through which it coacts with the cylinder.

11. In a nut blanching machine, the combination of a revolving cylinder, a belt coacting with the surface of said cylinder to rub the skins from nuts introduced between the cylinder and belt, and means for positively driving each end of the belt independently of the other but at equal speed, and thereby imparting a definite movement to the belt in the direction of feed, but at a rate slower than the surface rate of the cylinder.

12. In a nut blanching machine, the combination of a revolving cylinder, a belt coacting with the surface of said cylinder to rub the skins from nuts introduced between the cylinder and belt, and means for imparting a definite movement to the belt in the direction of feed, but at a rate slower than the surface rate of the cylinder; said means consisting of positively driven rolls acting upon said belt at opposite ends of its portion which coacts with the cylinder.

Signed at Chicago, Illinois, this 9th day of March, 1922.

JULIUS FRANK.
JOE DAVIS PIRTLE.